United States Patent [19]
Yoshida

[11] Patent Number: 4,608,665
[45] Date of Patent: Aug. 26, 1986

[54] SENTENCE MODIFIABLE ELECTRONIC DICTIONARY AND LANGUAGE INTERPRETER

[76] Inventor: Kunio Yoshida, 2541-10, Hari Tsuge-mura, Yamabe-gun, Nara-ken, Japan

[21] Appl. No.: 339,727

[22] Filed: Jan. 15, 1982

Related U.S. Application Data

[63] Continuation of Ser. No. 117,003, Jan. 30, 1980, abandoned.

[51] Int. Cl.[4] .............................................. G06F 9/00
[52] U.S. Cl. ................................................... 364/900
[58] Field of Search ... 364/200 MS File, 900 MS File

[56] References Cited

U.S. PATENT DOCUMENTS 4,159,536  6/1979  Kehoe et al. ......................... 364/900
4,218,760  8/1980  Levy ..................................... 364/900

OTHER PUBLICATIONS

U.K. Patent Application GB 2,014,765, Nov. 30, 1978.

Primary Examiner—Gareth D. Shaw
Assistant Examiner—John G. Mills
Attorney, Agent, or Firm—Birch, Stewart, Kolasch & Birch

[57] ABSTRACT

A portable electronic dictionary and language interpreter comprises a sentence memory, a word memory, and a control circuit. The sentence memory stores a plurality of incomplete sentences. The word memory contains plenty of words added to the incomplete sentences so that complete sentences are formed. The control circuit is provided for controlling the manner by which each of the words generated from the word memory is added to each of the incomplete sentences developed from the sentence memory. Each of the words to be added is directed by an input device. The input device may comprises alphabetical key switches or a search key switch actuated for addressing the word memory. A display is provided for indicating the complete sentences.

8 Claims, 6 Drawing Figures

SENTENCE MODIFIABLE ELECTRONIC DICTIONARY AND LANGUAGE INTERPRETER

This application is a continuation of copending application Ser. No. 117,003, filed on Jan. 30, 1980, now abandoned.

BACKGROUND OF THE INVENTION

The present invention relates in general to a word information storage and retrieval device and, more particularly, to an electronic dictionary and language interpreter for providing efficient and rapid retrieval of any desired word or words stored therein.

Recently, a new type of electronic device called an electronic dictionary and language interpreter has been available on the market. The electronic dictionary and language interpreter differs from conventional types as electronic devices in that the former is of a unique structure which provides for efficient and rapid retrieval of word information stored in a memory. An example of such an electronic dictionary and language interpreter was disclosed in Levy, U.S. Pat. No. 4,158,236, June 12, 1979, "ELECTRONIC DICTIONARY AND LANGUAGE INTERPRETER".

It is further desirable that these portable devices modify one or more words in a composition or sentence to form a different composition or sentence.

SUMMARY OF THE INVENTION

Accordingly, it is the primary object of the present invention to provide an improved electronic dictionary and language interpreter capable of modifying one or more words in a stored composition or sentence to form a different composition or sentence.

It is a further object of the present invention to provide an improved electronic dictionary and language interpreter comprising means for showing one or more words useful in modifying a stored composition or sentence to a different composition or sentence.

It is a further object of the present invention to provide an improved electronic dictionary and language interpreter comprising a memory for storing a first composition or sentence and for storing one or more words useful in partially altering the first composition or sentence and a control means for applying the one or more words to the first composition or sentence to modify it using the one or more words and to form a second composition or sentence.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a portable electronic dictionary and language interpreter comprises a sentence memory, a word memory, and a control circuit. The sentence memory stores a plurality of incomplete sentences. The word memory contains many words which may be added to the incomplete sentences so tht complete sentences are formed. The control circuit is provided for controlling the manner by which each of the words generated from the word memory is added to each of the incomplete sentences developed from the sentence memory.

Each of the words to be added is directed by an input device. The input device may comprise alphabetical key switches or a search key switch actuated for addressing the word memory. A display is provided for indicating the complete sentences.

BRIEF DESCRIPTION OF THE DRAWING

The present invention will become fully understood from the detailed description given hereinbelow and accompanying drawing which is given by way of illustration only, and thus is not limitative of the present invention and wherein.

DESCRIPTION OF THE INVENTION

First of all, any language can be applied to an electronic dictionary and language interpreter of the present invention. An input "source" word or words are spelled in a specific language to obtain an equivalent word or words, or a translated word spelled in a different language corresponding thereto. The languages can be freely selected. According to an example of the present invention, it is assumed that the "source" language is Japanese and the translated language is English.

Figure 1:
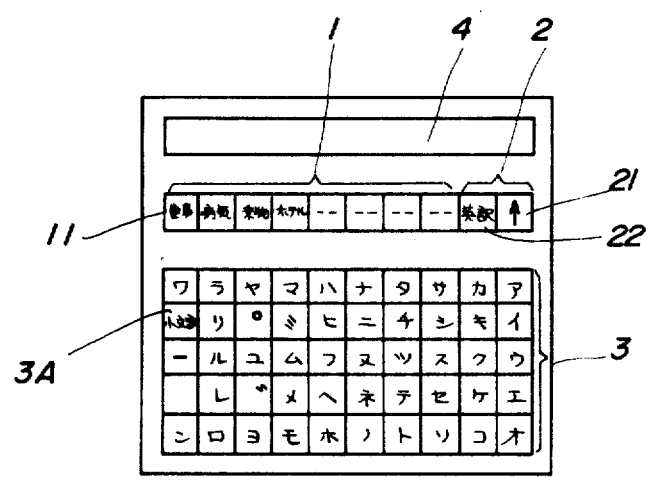
FIG. 1 is a plan view of an electronic dictionary and language interpreter according to the present invention.

Referring to FIG. 1, there is illustrated in a plan view an electronic dictionary and language interpreter of the present invention.

The electronic dictionary and language interpreter comprises a classification keyboard 1, a functional keyboard 2, a Japanese syllabary keyboard 3, and a display 4.

The classification keyboard 1 contains a plurality of classification key switches operable to classify a desired number of sentences into generic categories or groups, for example, dish-related compositions, hotel-related compositions. The functional keyboard 2 includes an advancing key switch 21 and a translation key switch 22. The Japanese syllabary keyboard 3 contains a full complement of Japanese alphabetical key switches actuated to provide coded information representing the actuated Japanese alphabetical key switch. The full complement of Japanese alphabetical key switches are aligned in the Japanese alphabetical order.

An appropriate number of Japanese compositions and the equivalent English compositions are stored in the electronic dictionary and language interpreter shown in FIG. 1. The above-stated three kinds of keyboards are actuated to enter coded information corresponding to a Japanese word or words. In other words, Japanese word or words are applied to the electronic dictionary and language interpreter to obtain an English composition modified or partially altered by the Japanese word or words.

A meal classification key switch 11 is contained within the classification keyboard 1 with a label in Japanese, the translated word being equivalent to "meal" in English. Other key switches within the classification keyboard 1 are labeled by their equivalent Japanese words corresponding respectively to "disease", "vehicle", "hotel", etc. Four "meal", "disease", "vehicle", and "hotel" classification key switches are aligned from the left end.

The "meal" classification key switch 11 is actuated such that the electronic dictionary and language interpreter generates a number of Japanese compositions in connection with "meal". In response to the actuation of the "meal" classification key switch 11, the first Japanese composition with respect to "meal" is developed and then indicated in the display 4. A number of the Japanese compositions are subsequently generated in accordance with the actuation of the advancing key switch 21. When the first Japanese composition or sentence is indicated in the display 4, the advancing key switch 21 is once actuated to replace the first Japanese composition or sentence with the second Japanese composition or sentence with respect to "meal". If a desired Japanese composition or sentence is located, a further actuation of the advancing key switch 21 is not required.

Under the circumstances where the desired Japanese composition or sentence is obtained and shown in the display 4, a desired number of Japanese alphabetical key switches within the Japanese syllabary keyboard 3 are actuated to enter one or more Japanese words corresponding to the actuated key switches, so that these words will replace them with one or more old Japanese words contained within the desired Japanese composition or sentence. Then the translation key switch 22 is actuated to obtain an equivalent English composition or sentence corresponding to the Japanese composition or sentence as modified to include the one or more Japanese words. The equivalent English composition or sentence is also indicated in the display 4.

A small letter switch 3A is provided in the Japanese syllabary keyboard 3. The small letter key switch 3A functions to change the coded information developed by the actuation of one of the Japanese alphabetical key switches from the coded information representing the capital letter to that representing the corresponding small letter under the condition where the small letter key switch 3A is actuated immediately after the actuation of the one of the Japanese alphabetical key switches. When the next one of the Japanese alphabetical key switches is actuated immediately after the small letter key switch 3A, the coded information developed by the actuation of the next one of the Japanese key switches is not altered from that representing the capital letter to that representing the small letter any more. The small letter key switch 3A is labeled as the Japanese words corresponding to "small letter" in English.

Any one of the classification key switches contained within the classification keyboard 1 can be combined with any one of the Japanese alphabetical key switches within the Japanese syllabary keyboard 3. In such a case, a selection key switch may be further provided for selecting either the operation as the classification key switches or the operation as the Japanese alphabetical key switches. Both the function as the classification key switches and the function as the Japanese alphabetical key switches may be labeled in the combined key switches in the Japanese language.

The selection key switch may be employed in the functional keyboard 2.

The operation of the electronic dictionary and language interpreter of the present invention is explained in short as follows:

The "meal" classification key switch 11 is actuated and the advancing key switch 21 is then actuated to find a desired type of composition in the Japanese language. Desired types of the Japanese compositions, as summarized below, are displayed in the display 4 in the Japanese language.

The Japanese compositions are displayed in the Japanese language as follows:

(1) ( ) ハ イツ トレマスカ ?
(2) ( ショクジ ) ハ イツ トレマスカ ?
(3) ( チョウショク、チュウショク、ユウショク ) ハ イツ トレマスカ ?
(4) ユウショク ハ イツ トレマスカ ?
(5) ユウショク ハ イツ トレマスカ ?

The corresponding English compositions are as follows, respectively;
(1) When can I have ( )?
(2) When can I have ( meal )?
(3) When can I have (breakfast, lunch, dinner)?
(4) When can I have dinner?
(5) When can I have dinner?

The meanings of the indicated Japanese compositions are explained in terms of the corresponding English compositions:

(1): One or more Japanese words to be replaced are not indicated in the display 4, although provided within brackets.
(2): A Japanese general term covering one or more Japanese words to be placed is shown in the display 4, provided within brackets. In this instance, the Japanese general term means "meal" generally representing "breakfast", "lunch", and "dinner".
(3): One or more Japanese words to be replaced are displayed in the display 4, provided within brackets.
(4): Only one Japanese word to be replaced, selected from words to be replaced, is indicated in the display 4. Only the selected Japanese word goes on and off.
(5): Only one Japanese word to be replaced is indicated in the display 4 by selection. Only the selected Japanese word is indicated by desirable methods so that it can be replaced. One of the desirable methods is that an underline as is indicated under the selected Japanese word.

If the operator wants to obtain an English composition available in asking for the time of "breakfast", in terms of the Japanese composition indicated in the display 4, the Japanese alphabetical key switches are actuated to enter the coded information corresponding to the Japanese word equivalent to "breakfast" in the English language. Under the circumstances, the translation key switch 22 is then actuated. A modified English composition, "When can I have breakfast ?", is obtained by adding "breakfast" to the replaceable term of the English composition corresponding to the indicated Japanese composition. The modified English composition is then indicated in the display 4.

Figure 2:
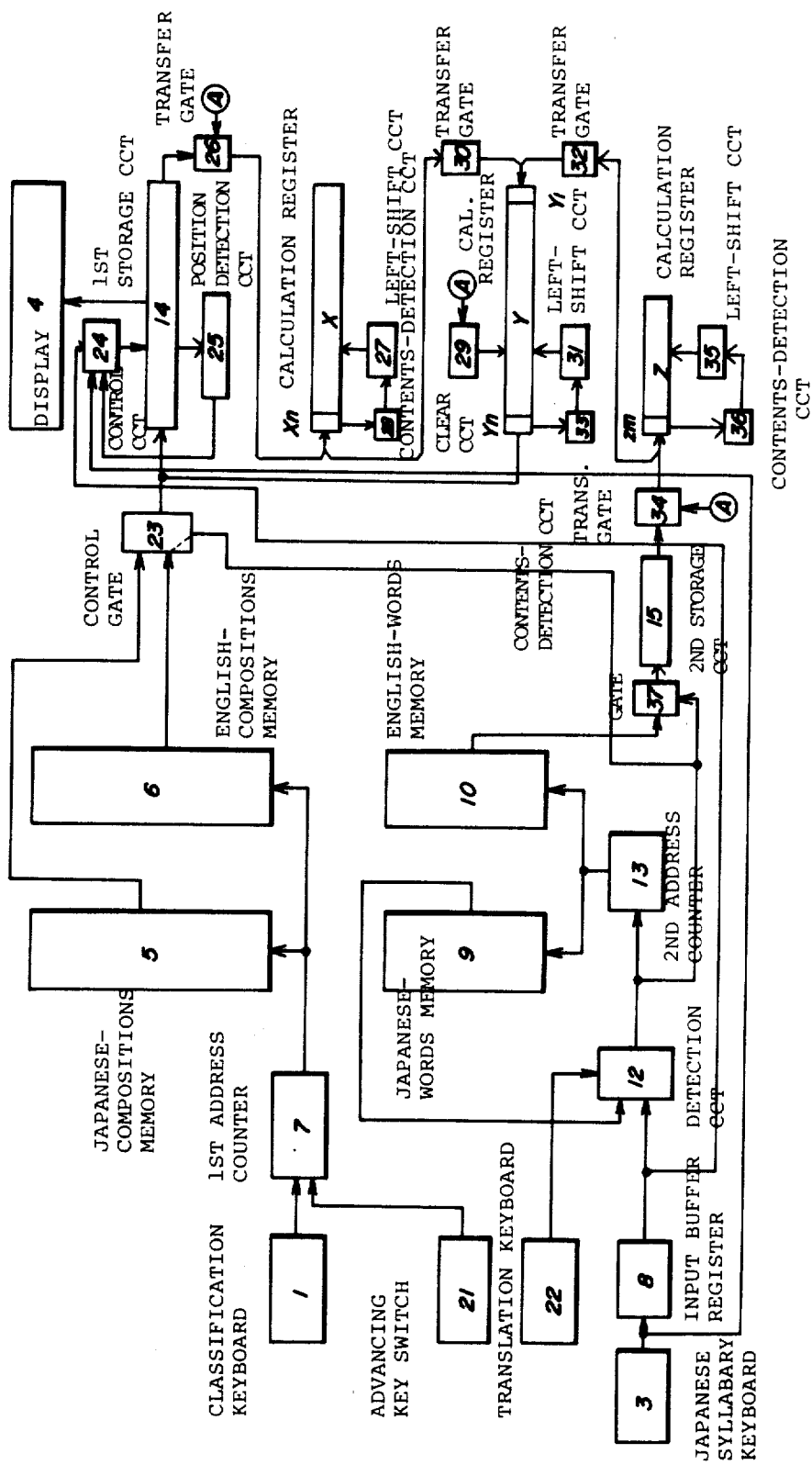
FIG. 2 is a block diagram of a control circuit incorporated within the electronic dictionary and language interpreter shown in FIG. 1.

FIG. 2 shows a circuit configuration of a control circuit accomodated within the electronic dictionary and language interpreter shown in FIG. 1. Like elements corresponding to those shown in FIG. 1 are indicated by like reference numerals.

The control circuit mainly comprises a Japanese-compositions memory 5, an English-compositions memory 6, two address counters 7 and 13, an input buffer register 8, a Japanese-words memory 9, an English-words memory 10, a detection circuit 12, two storage circuits 14, and 15 and three calculation registers X, Y and Z.

There are further connected a control gate 23, a control circuit 24, a position detection circuit 25, four transfer gates 26, 30, 32, and 34 a clear circuit 29, three contents-detection circuits 28, 33 and 36, three left-shift circuits 27, 31, and 35, and a gate circuit 37.

The Japanese-compositions memory 5 stores a plurality of Japanese compositions each of which contains one or more Japanese words to be replaced by new one or more Japanese words externally applied. It is assumed that the Japanese-compositions memory 5 stores and develops the Japanese composition classified as (1) hereinbefore. It may be possible that the Japanese-compositions memory 5 has one or more complete Japanese-compositions containing no replaceable Japanese word. The Japanese-compositions memory 5 stores the plurality of Japanese compositions in a form such that a group of Japanese compositions, related to each of the classifications of the circumstances in which the Japanese composition is useful, are located at a continuous set of addresses.

The English-compositions memory 6 stores a plurality of incomplete English compositions corresponding to the Japanese compositions recorded within the Japanese-compositions memory 5. The following English compositions are stored in the English-compositions memory 6 to represent the above-stated English compositions to be indicated, respectively.

(1) When can I have * ?
(2) When can I have * meal * ?
(3) When can I have * breakfast * lunch * dinner * ?
(4) When can I have * dinner * ?

The English composition classified above as (5) is assumed to be obtained by the storage format [4] by selection. In this instance, the English—compositions memory 6 stores and generates the storage format [1]. Star indication " * " contained within the storage formats [1] to [4] represents the positions of one or more English words to be changed.

The first address counter 7 functions to address the Japanese-compositions memory 5 and the English-compositions memory 6. The number of the address specified by the first address counter 7 is selected by the input data entered by the classification keyboard 1. The selected address stored in the first address counter 7 is increased by one according to the actuation of the advancing key switch 21. It is assumed that the first address counter 7 drives the Japanese-compositions memory 5 and the English-compositions memory 6 so that the English composition now developed from the English-compositions memory 6 is a translated composition equivalent to the Japanese composition now generated from the Japanese-compositions memory 5.

The input buffer register 8 is responsive to the Japanese syllabary keyboard 3 for storing temporarily coded information representing one or more Japanese alphabetical words. The Japanese-words memory 9 stores a plurality of translated Japanese words equivalent to the English words to be added to the incomplete English compositions developed from the English-compositions memory 6. The English-words memory 10 contains a plurality of English translated words equivalent to the plurality of Japanese words stored in the Japanese-words memory 9.

The detection circuit 12 is connected to the input buffer register 8 and the Japanese-words memory 9. The detection circuit 12 acts to determine the equivalency between the word information developed from the input buffer register 8 and the word data generated from the Japanese-words memory 9 under control of the second address counter 13. The detection circuit 12 generates output signals in accordance with the results of the composition. The second address counter 13 is connected to the Japanese-words memory 9 and the English-words memory 10 for addressing them. The output signals from the detection circuit 12 are admitted to the second address counter 13. When the output signals from detection circuit 12 represent a disagreement between the word data from the input buffer register 8 and those from the Japanese-words memory 9, the number of the address defined in the second address counter 13 is increased by one.

When the output signals from the detection circuit 12 represent an agreement between the word data from the input buffer register 8 and those from the Japanese-words memory 9, the address defined by the second address counter 13 is fixed and not increased any more. The second address counter 13 provides access to the Japanese-words memory 9 and the English-words memory 10 so that the English words, now developed from the English words memory, 10 are translated words and are equivalent to the Japanese words now derived from the Japanese-words memory 9.

The first storage circuit 14 is provided for storing the Japanese and the English compositions respectively developed from the Japanese-compositions memory 5 and the English-compositions memory 6 under the control of the first address counter 7, and for storing the Japanese words data generated from the input buffer register 8. The second storage circuit 15 is connected for storing the English words data developed from the English-words memory 10 under the control of the second address counter 13. The display 4 is responsive to the first storage circuit 14 for indicating the words data stored in the first storage circuit 14.

The detection circuit 12 is coupled to the translation key switch 22. The detection circuit 12 is responsive to the actuation of the translation key switch 22 for controlling the count-up operation of the second address counter 13 until the equivalency between the Japanese words data generated from the Japanese-words memory 9 and those from the input buffer register 8 is determined by the detection circuit 12. The control gate 23 is coupled to the detection circuit 12 for applying the words data to the first storage circuit 14. While the output signals from the detection circuit 12 indicate disagreement between the words data from the input buffer register 8 and those from the Japanese-words memory 9, the Japanese compositions developed from the Japanese-compositions memory 5 are subsequently applied to the first storage circuit 14 through the control gate 23.

The incomplete Japanese compositions now stored in the first storage circuit 14 are indicated in the display 4. Under the circumstances where a required type of the Japanese composition is selected which is displayed in the display 4, the Japanese syllabary keyboard 3 is actuated to develop one or more Japanese words to cause replacement. The Japanese words data equivalent to the one or more Japanese words for replacement of the corresponding one or more English words are applied from the input buffer register 8 to the first storage circuit 14 through the control circuit 24. The Japanese words data now applied to the first storage circuit 14 are indicated in the display 4. After the entry of the Japanese words for replacement is completed, the translation key switch 22 is actuated to initiate the replacement operation.

The control circuit 24 is coupled to the input buffer register 8 and the first storage circuit 14. Each time the Japanese syllabary keyboard 3 generates the Japanese words, the control circuit 24 is responsive to the Japanese syllabary keyboard 3 for transferring the Japanese words data developed from the input buffer register 8 into the first storage circuit 14. The one or more Japanese words for replacement stored in the first storage circuit 14 are indicated in the display 4 until the translation key switch 22 is actuated.

When the output signals from the detection circuit 12 represent agreement between the Japanese words data from the input buffer register 8 and those from the Japanese-words memory 9, the incomplete English compositions from the English-compositions memory 6 are transferred to the first storage circuit 14 through the control gate 23.

The gate circuit 37 is connected to the English-words memory 10 and the detection circuit 12. The gate circuit 37 is responsive to the output signals from the detection circuit 12, which represent agreement between the Japanese words data from the Japanese-words memory 9 and those from the input buffer register 8. The gate circuit 37 permits the transference of the English words developed from the English-words memory 10 into the second storage circuit 15. The position detection circuit 25 is connected to the first storage circuit 14 for detecting storage positions within the first storage circuit 14 to be changed.

Figure 3:
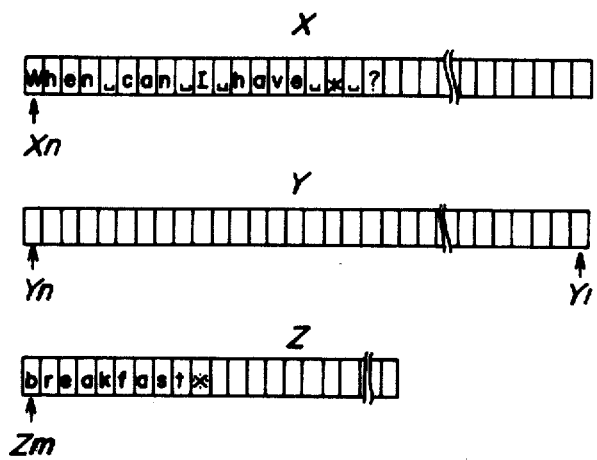
FIG. 3 is a schematic representation of storage formats within three calculation registers connected to the control circuit indicated in FIG. 2.

FIG. 3 shows storage formats performed in the three calculation registers X, Y and Z. In FIG. 3, three representations Xn, Yn and Zn are the uppermost digits of the calculation registers X, Y, and Z, respectively. A representation Y1 is the end digit of the calculation register Y. The calculation register X has the same capacity for storage, n digits, as does the calculation register Y. The calculation register Z has a capacity for storage of n digits, including the English compositions and the end mark "*", representing the termination of the one or more English words to be changed.

The first transfer gate 26 functions to transfer the words data from the first storage circuit 14 to the calculation register X. Control signals (A) are developed in response to the actuation of the translation key switch 22. The control signals (A) direct that the words data stored in the first storage circuit 14 are transferred into the calculation register X, that the words data in the second storage circuit 15 are admitted to the calculation register Z, and that the contents of the calculatin register Y are completely canceled. The control signals (A) are entered to the transfer gates 26 and 34, and the clear circuit 29. The transfer gate 26 is responsive to the generation of the control signals (A) for transferring the English composition stored in the first storage circuit 14 to the calculation register X.

Similarly, the transfer gate 34 is responsive to the generation of the control signals (A) for transferring the English words data stored in the second storage circuit 15 into the calculation register Z. The clear circuit 29 is connected to the calculation register Y for canceling completely the information contained within the calculation register Y. The clear circuit 29 is responsive to the generation of the control signals (A) for canceling the calculation register Y.

The contents-detection circuit 28 is provided for detecting whether the uppermost digit Xn contains the star mark " * " or not. The contents-detection circuit 33 is provided for determining whether the calculation register Yn contains information or not. The contents-detection circuit 36 is coupled for detecting whether the uppermost digit Zm stores the end mark " ✻ ".

The left-shift circuits 27, 31, and 35 are coupled so that the contents of the calculation registers X, Y and Z are shifted to the left by one digit as a whole. The transfer gate 30 is provided for transferring the contents in the uppermost digit Zn of the calculation register X into the bottom digit Y1 of the calculation register Y. The transfer gate 32 is provided for transmitting the contents in the uppermost digit Zm of the calculation register Z into the bottom digit Y1 of the calculation register Y.

Figure 4:
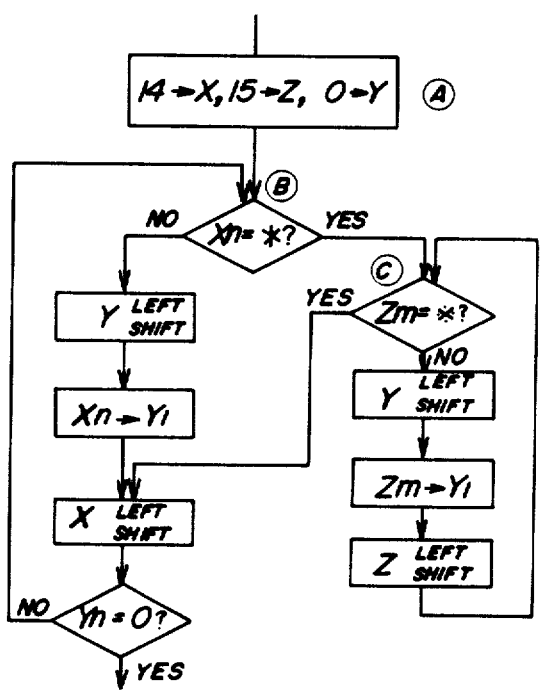
FIG. 4 is a flow chart representing control operations employed in the control circuit of FIG. 2.

FIG. 4 shows a flow chart explaining the operation by the three calculation registers X, Y, and Z. When the control signals (A) are developed, the three calculation registers X, Y, and Z contain the storage information shown in FIG. 3. In FIG. 3, the star indication " * " represents the positions of the one or more English words for replacement. The end mark " ✻ " represents the end of the one or more English words for replacement. The space mark "⊔" indicates the spacing between two English words. These mark signals are applied from the English-compositions memory 6 or the English-words memory 10.

In FIG. 4, the program stage labeled as (A) is related to the circumstances where the control signals (A) are developed. The following program stage labeled as (B) is performed to determine whether uppermost digit Xn contains the star indication " * " or not. If not, until the uppermost digit Xn contains the star indication " * ", it is repeated so that the contents of the calculation register Y are shifted to the left by one digit, that the contents of the uppermost digit Xn are transferred to the bottom digit Y1, that the contents of the calculation register X are shifted to the left by one digit, and that whether the contents of the uppermost digit Yn contain information is determined.

In such a case, the star indication " * " is contained within the uppermost digit Zn in time by the process labeled as "X LEFT SHIFT". Then "Yn≠0" is determined. Now the uppermost digit Yn is not null information. Thus, the program stage labeled as B is selected so that the three calculation registers X, Y and Z contain the information shown in FIG. 5(A). Then "YES" is selected in the program stage (B) to proceed to the following program stage (C).

Figure 5:
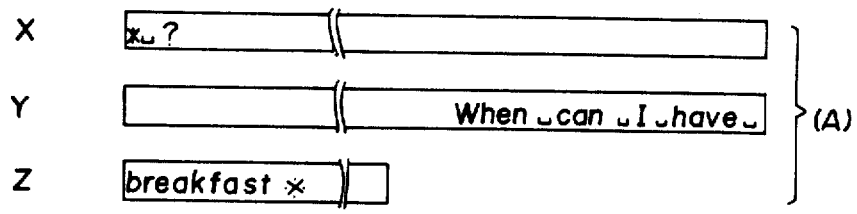
FIG. 5 is a schematic representation of the storage format within the three calculation registers related to that shown in FIG. 3.
Figure 5:
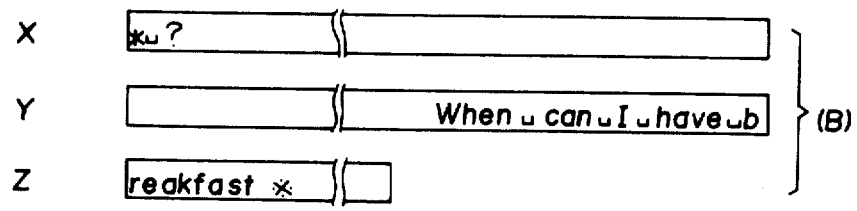
Figure 5:
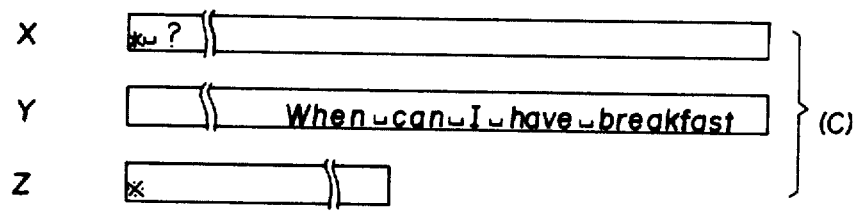
Figure 5:
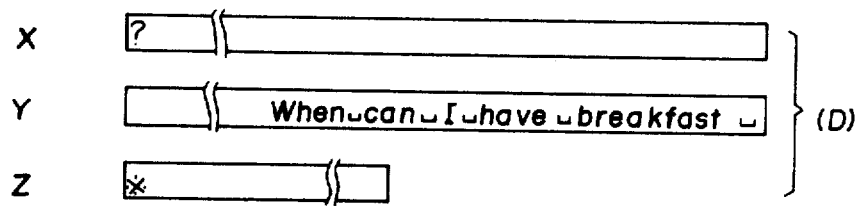
Figure 5:
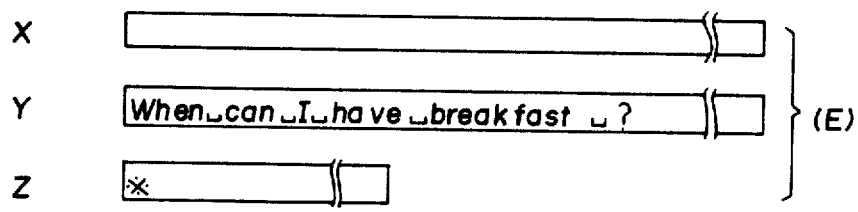

In the program stage (C), it is determined whether the uppermost digit Zm contains the end mark "✻" or not. Since the uppermost digit Zm≠✻, it is repeated so that the contents of the calculation register Y are shifted to the left by one digit, that the contents of the uppermost digit Zm are transferred to the bottom digit Y1, and that the contents of the calculation register Z are shifted to the left by one digit. And the program returns to the program stage (C). FIG. 5(B) shows the storage formats of these calculation registers X, Y, and Z at the time the program returns to the program stage (C).

When the end mark ✻ is contained within the uppermost digit Zm of the calculation register Z by the calculation labeled as "Z LEFT SHIFT", the three calculation registers X, Y and Z show the storage as indicated in FIG. 5(C) in the program stage (C). As "YES" is obtained in the program stage (C) at this time, the program advances to the calculation labeled as "X LEFT SHIFT" in which the uppermost digit Xn sweeps the star indication " * " and receives the space mark "⊔". The program advances to the following calculation "Yn≠0?" in which the program stage (B) is selected because Yn=0.

Since Xn=⊔, Xn≠ * is obtained to thereby select the program lead by "NO" from the program stage (B). After "Y LEFT SHIFT", "Xn→Y1", and "X LEFT SHIFT", the calculation of "Yn≠0?" is determined, in which case the three calculation registers X, Y, and Z have the information shown in FIG. (D). These program sequences are repeated until "YES" is obtained in the calculation "Yn≠0?". When Yn≠0, this means that the one or more English words are added to the incomplete English composition for replacement purposes. FIG. 5(E) represents the information of the three calculation registers X, Y, and Z, when the replacement operation is completed.

The calculation register Y contains the complete English composition where the one or more English words are added partially to the incomplete English composition generated from the English-compositions memory 6. The total contents of the calculation register Y are transferred to the first storage circuit 14 so that the display 4 shows the complete English composition containing the one or more English words to be added.

It may be possible that the one or more Japanese words entered in the first storage circuit 14 by the input buffer register 8 are added to the incomplete Japanese composition developed from the Japanese-compositions memory 5 to obtain the complete Japanese composition. The complete Japanese composition can be indicated in the display 4. The add operation of the one or more Japanese words may be accomplished in the similar manner as that for the English word as mentioned above.

Figure 6:
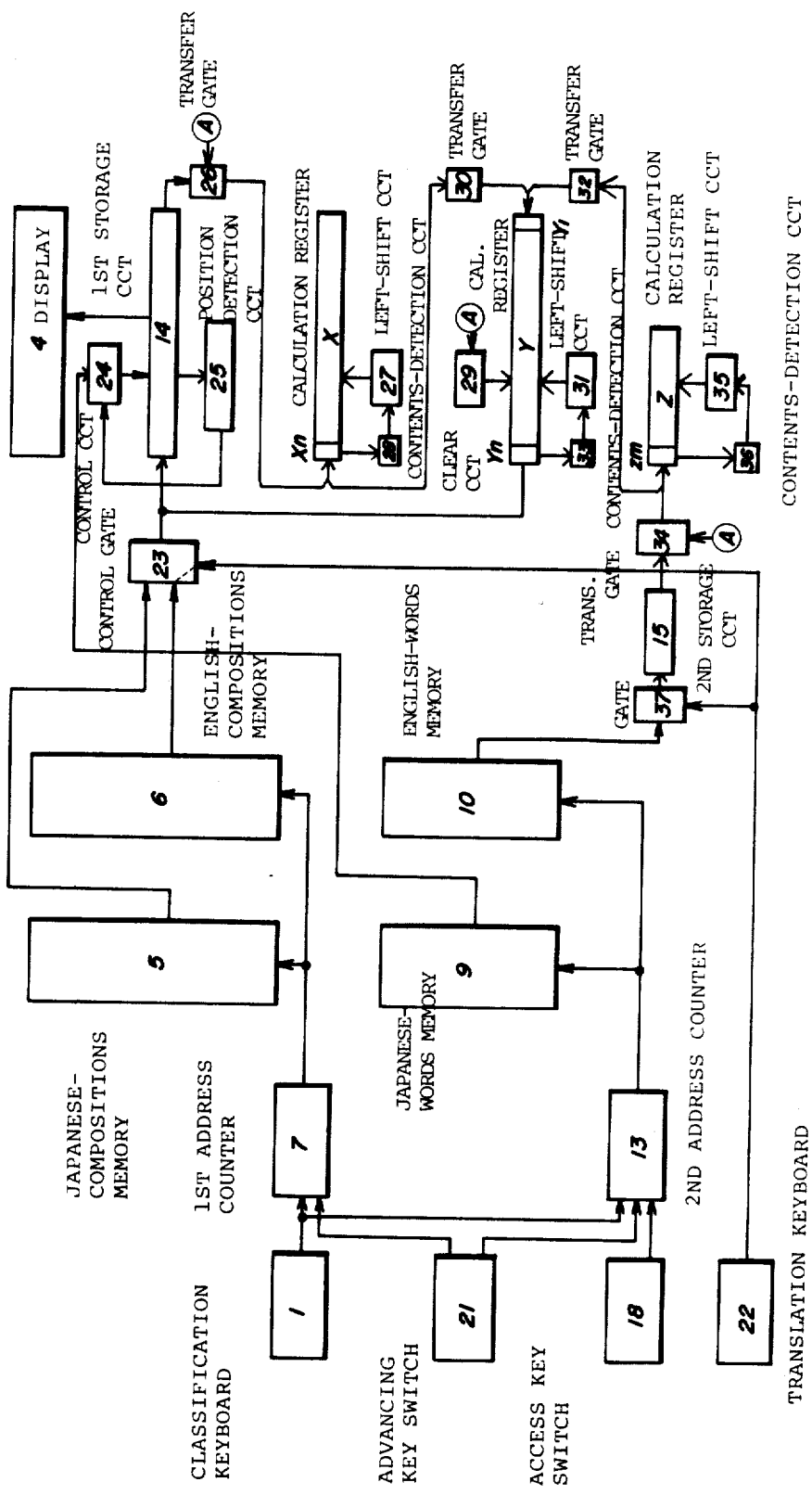
FIG. 6 is a block diagram of another preferred example of the control circuit associated with that in FIG. 2.

FIG. 6 shows a block diagram of another preferred form of the control circuit. Like elements corresponding to those shown in FIG. 2 are indicated by like reference numerals.

In this preferred embodiment of the present invention, an access key switch 18 shown in FIG. 6 is added in place of the Japanese syllabary keyboard 3 shown in FIG. 2. The access key switch 18 is actuated to develop successively the Japanese words useful in adding the translated English words to the incomplete English composition. The Japanese words are stored in the Japanese-words memory 9. The Japanese words are indicated in the display 4. The complete English compositions are indicated in the display 4 as well.

It is assumed that a desired type of the incomplete Japanese compositions is selected in the similar manner as stated above. Then the access key switch 18 is actuated to increase the number of the address set in the second address counter 13.

The classification keyboard 1 is actuated so that the number of the leading address set in the second address counter 13 is selected. This is the same as in the above-mentioned preferred embodiment of the present invention.

The second address counter 13 is connected to the classification keyboard 1, the advancing key switch 21, and the access key switch 18. The number of the address set in the second address counter 13 is initially selected by the information from the classification keyboard 1, the advancing key switch 21, and the access key switch 18. The second address counter 13 addresses the Japanese-words memory 9 and the English-words memory 10 according to the number of the address defined therein.

One or more Japanese words are developed from the Japanese-words memory 9 according to the access of the second address counter 13. The one or more Japanese words are applied to the first storage circuit 14 through the control circuit 24. The display 4 indicates the one or more Japanese words. If the one or more Japanese words do not match any desired word useful for adding purposes, the access key switch 18 is once again actuated to increase the number of the address defined in the second address counter 13. Each actuation of it enables the second address counter 13 to increase the number of the address by one. Then the following one or more Japanese words are generated from the Japanese-words memory 9 and then indicated in the display 4.

When any desired Japanese word is developed and displayed in the display 4, the translation key switch 22 is actuated to initiate the adding operation of the translated one or more English words equivalent to the specified one or more Japanese words. In response to the actuation of the translation key switch 22, the second storage circuit 15 receives the one or more translated English words generated from the English-words memory 10 through the gate circuit 37. At the same time, the incomplete English composition developed from the English-compositions memory 6 is entered into the first storage circuit 14 through the control gate 23.

As a result, the above-mentioned adding operation of the one or more English words into the incomplete English composition is performed in the same manner as mentioned previously. It may be possible that a complete Japanese composition can be obtained similarly and indicated in the display 4 using the one or more Japanese words developed from the Japanese-words memory.

The invention being thus described, it will be obvious that the same may be varied in many ways. Such variations are not to be regarded as a departure from the spirit and scope of the invention, and all such modifications are intended to be included within the scope of the following claims.

I claim:

1. An electronic dictionary and language interpreter device wherein a first word or words represented in a first language are entered to obtain a second word or words represented in a second language equivalent to the first word or words, comprising:

first means for generating a sentence written in either the first language or the second language, said first means including first memory means for storing a plurality of sentences in the first language, the sentences each having provision therein for inserting at least one selected word to be thereby completed, second memory means for storing a like plurality of sentences in the second language, each sentence in the second language being a translation of sentences in the first language stored in the first memory means, and first selecting means for selecting an equivalent one of the sentences stored in said first and second memory means and for generating the selected sentence in response thereto;

second means for generating one or more written in the corresponding first language or second language, respectively, the one or more words being capable of being added to the selected sentence to form a complete sentence, said second means including third memory means for storing a plurality of words in said first language, fourth memory means for storing a like plurality of words in said second language, each word in the second language being a translation of a word in the first language stored in the third memory means, and second selecting means for selecting one or more of the equivalent words stored in the third and fourth memory means and for generating the selected words in response thereto; and adding means for adding the one or more words developed from the second means for generating into the selected sentence generated from the first means for generating thereby obtaining a complete sentence.

2. The device as set forth in claim 1, wherein the first selecting means further comprises:

first access means for addressing the first and second memory means, wherein the second selecting means comprises second access means for addressing the third and the fourth memory means, and means for activating the second access means to select the one or more words stored in the third and fourth memory means and to generate the selected words in response thereto.

3. The device as set forth in claim 2, wherein the means for activating comprises an alphabetical keyboard for entering word information representing the one or more words written in the first language.

4. The device as set forth in claim 2, wherein the means for activating comprises an access key switch for incrementing an address set in the second access means.

5. The device as set forth in claim 1, further comprising a display responsive to the adding means for displaying the complete sentence.

6. The device as set forth in claim 1, wherein the adding means comprises a register circuit.

7. The device as set forth in claim 6, wherein the register circuit comprises:

a first register responsive to the first means for storing the selected sentence;

a second register responsive to the second means for storing selected words to be added to the selected sentence;

a control circuit for controlling the first register and the second register to add the selected words to the selected sentence thereby obtaining the complete sentence; and a display coupled to the control circuit for displaying the complete sentence.

8. The device as set forth in claim 7, wherein the control circuit comprises:

a third register coupled to the first register and the second register;

transferring means for transferring the selected sentence from the first register to the third register;

transporting means for transporting the selected words from the second register to the third register; and means for controlling the transferring means and the transporting means to add the selected words to the portions of the sentence thereby obtaining the complete sentence.

* * * * *